United States Patent [19]
Grande et al.

[11] Patent Number: 5,110,068
[45] Date of Patent: May 5, 1992

[54] MULTI-AXLED PROPPED LANDING GEAR

[75] Inventors: Donald L. Grande, Des Moines; Harry C. Ralph, Kirkland, both of Wash.

[73] Assignee: The Boeing Company, Seattle, Wash.

[21] Appl. No.: 631,627

[22] Filed: Dec. 20, 1990

[51] Int. Cl.⁵ .................. B64C 25/26; B64C 25/34
[52] U.S. Cl. ........................... 244/102 SL; 244/100 R
[58] Field of Search ........ 244/100 R, 102 R, 102 SL, 244/103 R, 104 R, 104 FP

[56] References Cited

U.S. PATENT DOCUMENTS

| | | | |
|---|---|---|---|
| 2,578,200 | 12/1951 | Nicholl | 244/104 |
| 2,811,326 | 10/1957 | Westcott, Jr. | 244/102 R |
| 2,814,482 | 11/1957 | Anderson et al. | 267/64 |
| 3,083,937 | 4/1963 | Bainbridge et al. | 244/102 R |
| 3,091,416 | 5/1963 | Knights et al. | 244/104 R |
| 3,091,418 | 5/1963 | Pitt | 244/103 R |
| 3,162,403 | 12/1964 | Hoke | 244/100 |
| 3,327,974 | 6/1967 | Nicholl | 244/100 |
| 3,533,581 | 10/1970 | Leclercq | 244/104 R |
| 3,687,400 | 8/1972 | Fitzgerald et al. | 244/102 R |
| 3,951,361 | 4/1976 | Hrusch | 244/102 R |
| 3,954,232 | 5/1976 | Harper | 244/102 R |
| 4,155,522 | 5/1979 | Sealey | 244/102 R |
| 4,228,975 | 10/1980 | Sealey | 244/102 R |
| 4,359,199 | 11/1982 | Kramer et al. | 244/104 R X |
| 4,815,678 | 3/1989 | Gawne | 244/109 |
| 4,892,270 | 1/1990 | Derrien et al. | 244/104 R |

Primary Examiner—Joseph F. Peters, Jr.
Assistant Examiner—Carla Mattix
Attorney, Agent, or Firm—Bruce A. Kaser

[57] ABSTRACT

A landing gear for an aircraft has a multi-wheeled truck that is swung by a main prop from a stowed position to a lowered position below the aircraft. The truck is pivotably connected to the lower end of the main prop. When the gear is lowered, at least one rear prop extends between the upper end of the main prop and an aft region of the wheel truck. Both the main and rear props are telescoping members. However, the rear prop is releasably lockable to hold a certain fixed length when the aircraft is on the ground, so as to prevent pivoting movement of the wheel truck relative to the main prop. This impedes the ability of the aircraft to tip back when its center of gravity shifts aft during unloading.

11 Claims, 5 Drawing Sheets

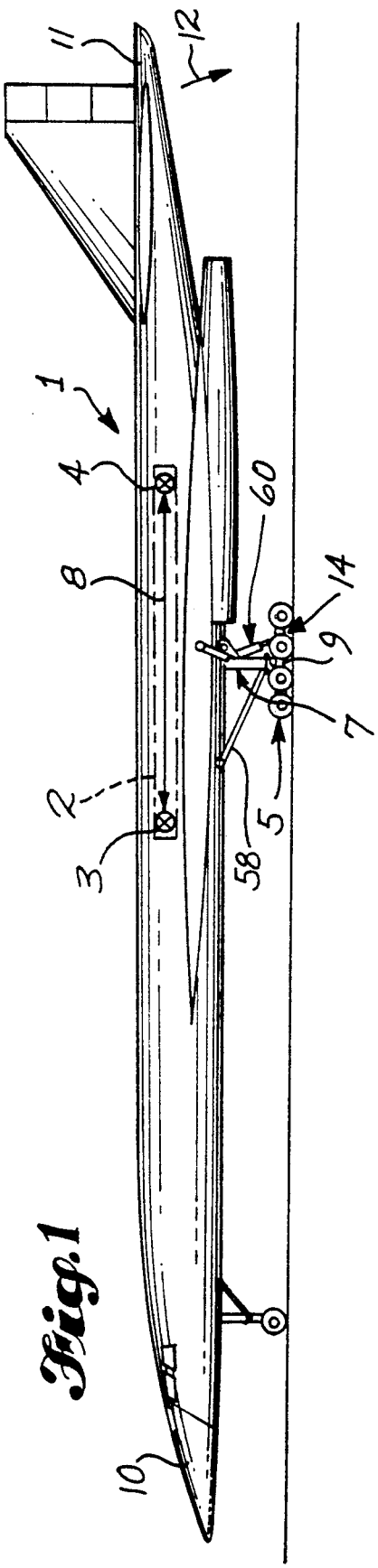

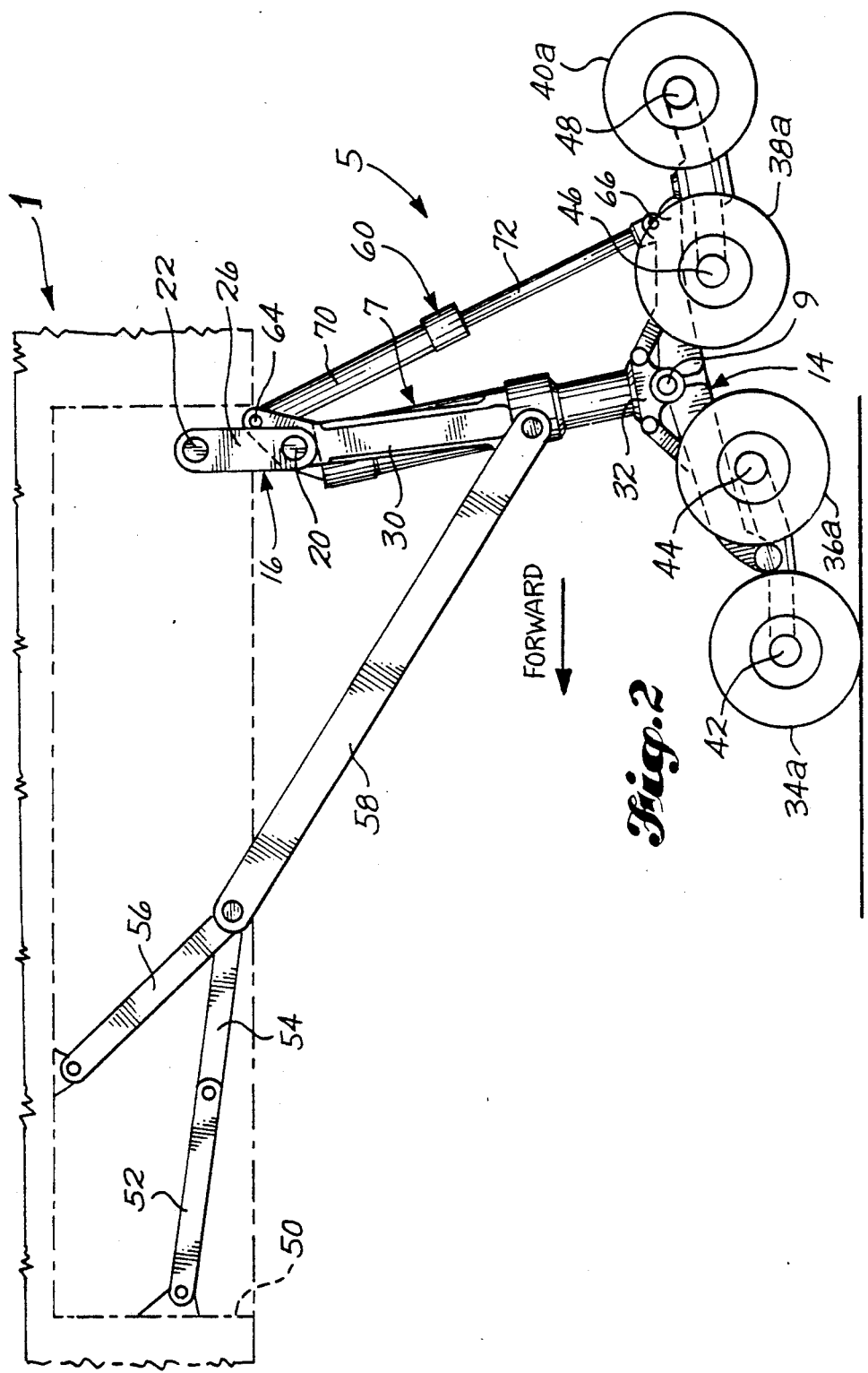

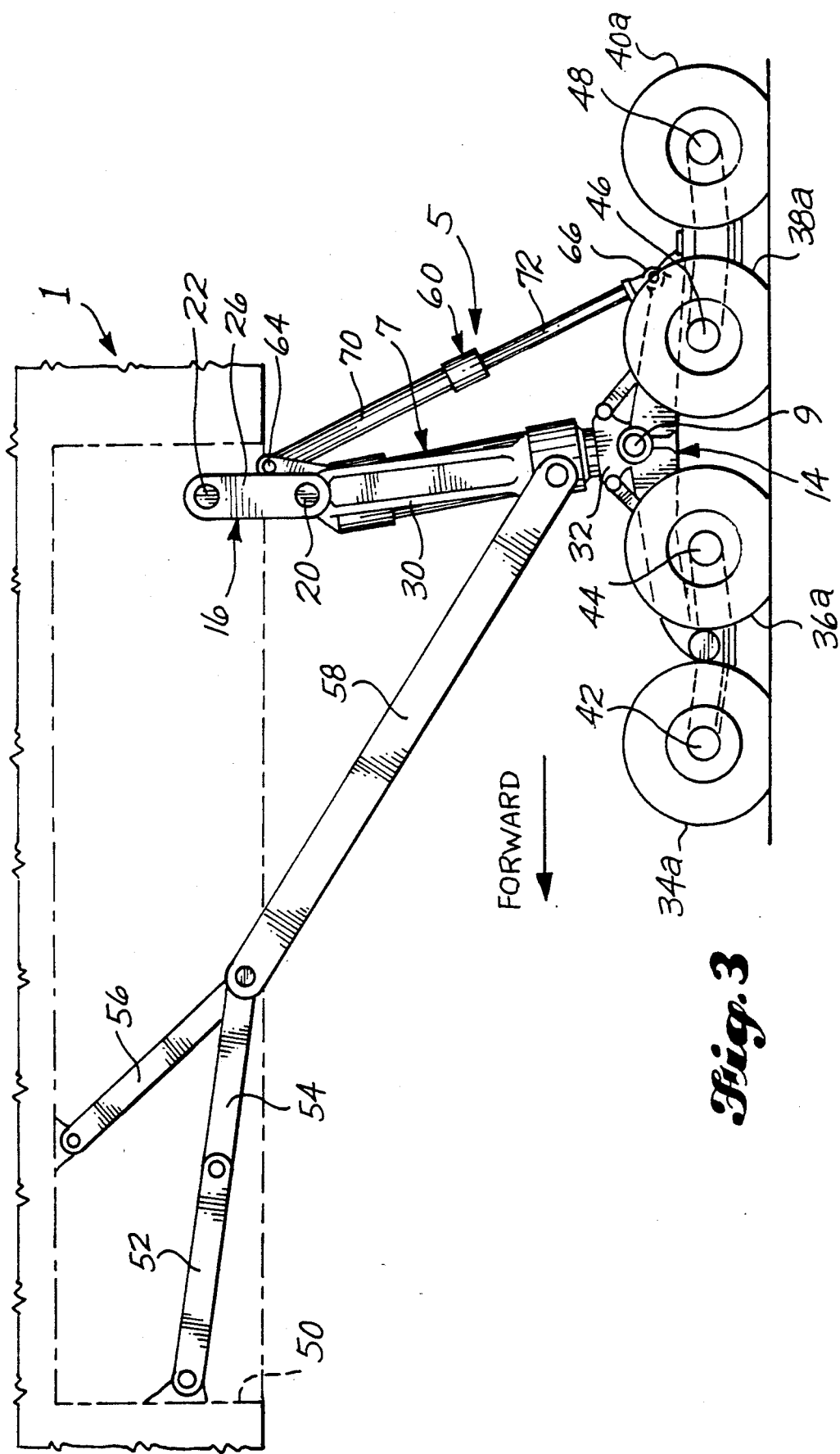

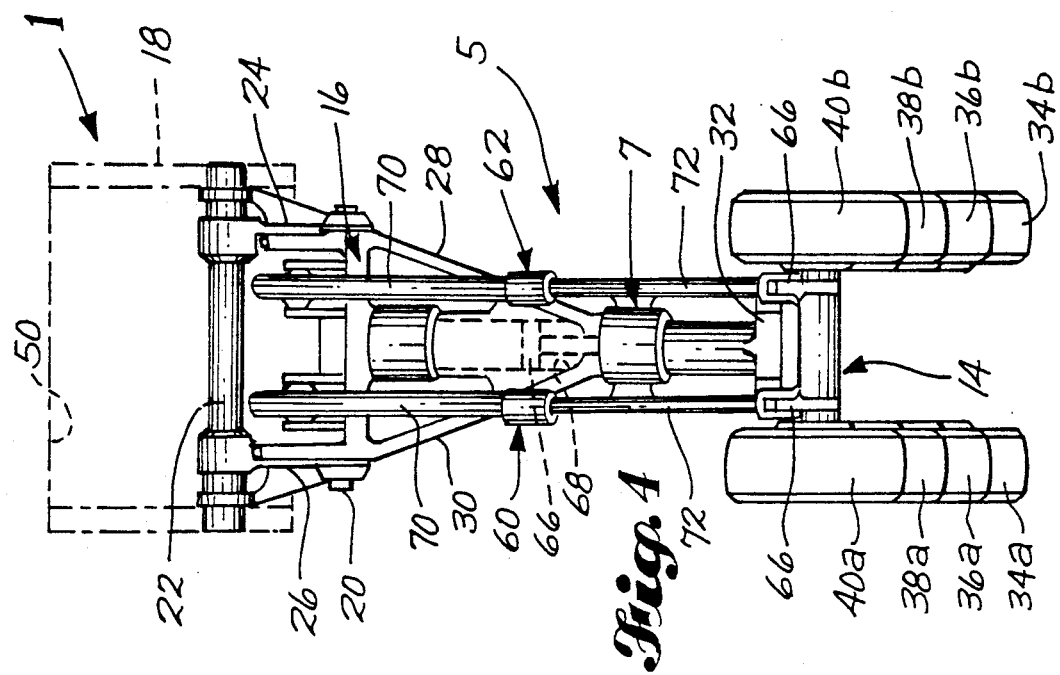
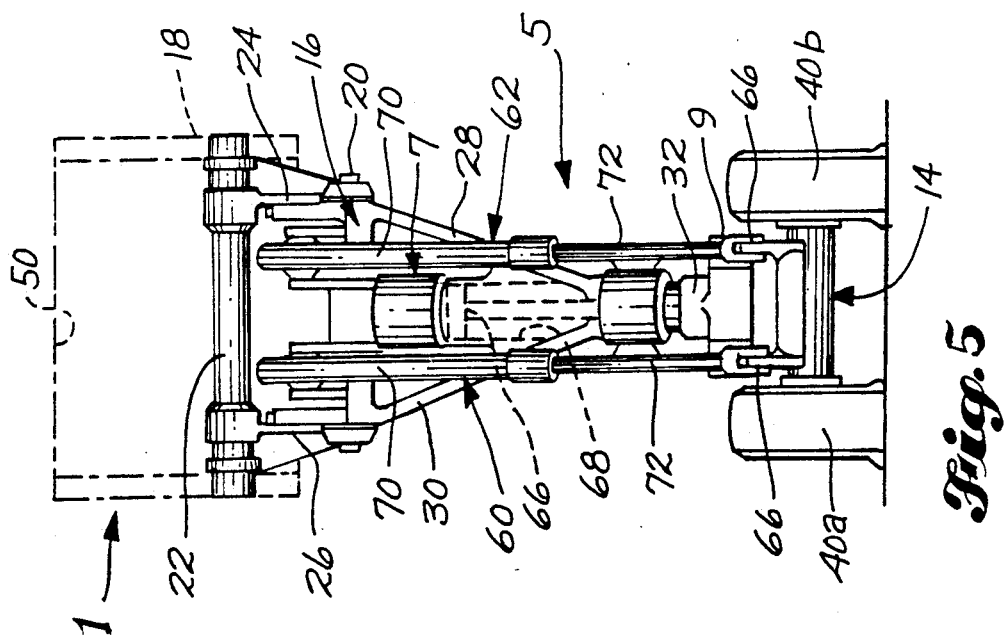

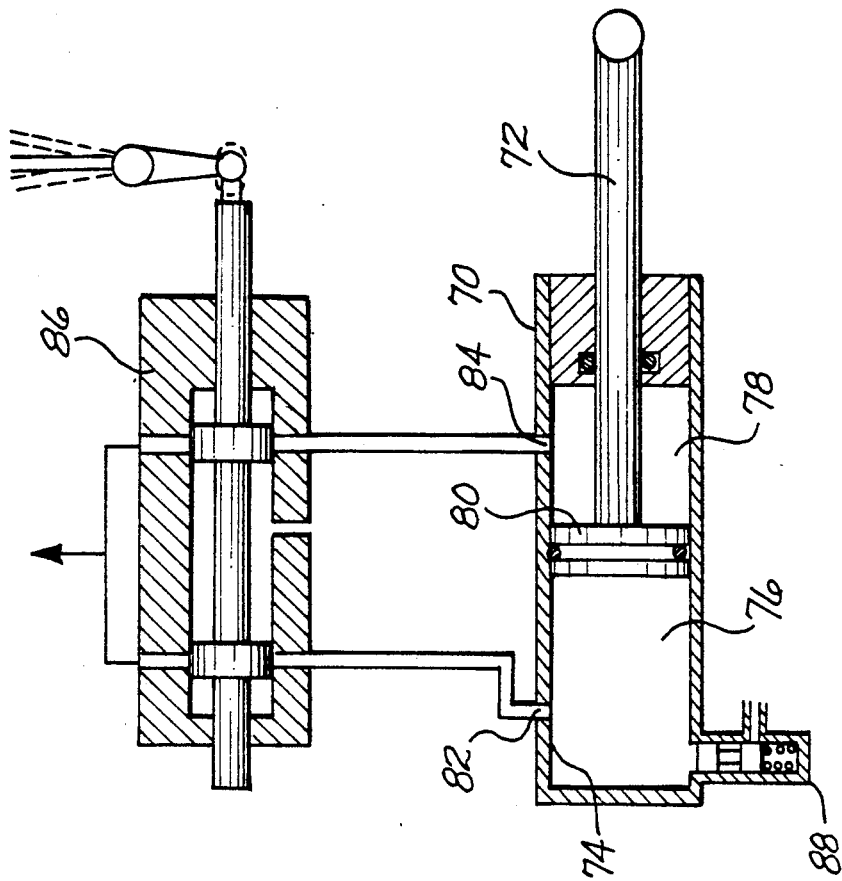
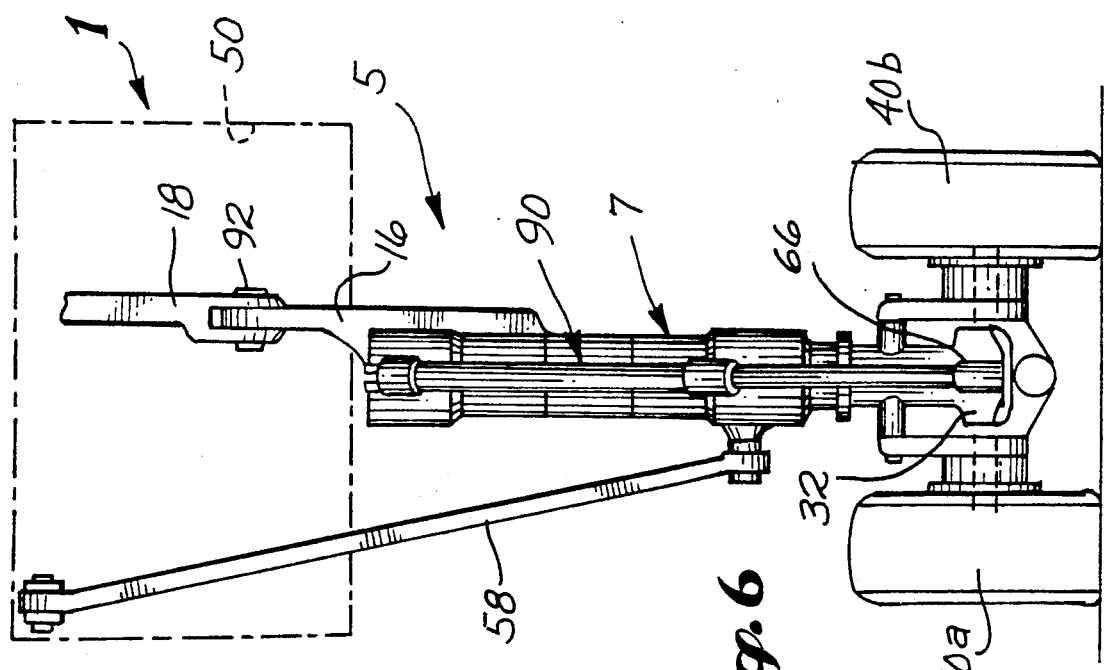

MULTI-AXLED PROPPED LANDING GEAR

DESCRIPTION

1. Technical Field

This invention relates to aircraft landing gear, and more particularly, to multi-wheeled landing gear for large aircraft.

2. Background Information

It is well-known that the center of gravity (CG) of an aircraft shifts in position between loaded and unloaded conditions. When an aircraft is in an unloaded condition, meaning without fuel and payload (e.g. no passengers or cargo), its center of gravity will normally shift aft of its position when loaded.

CG shift is especially large in SST (supersonic transport) type aircraft, which are designed to fly at very high speeds and have long range. Such aircraft have greater than normal weight differences between their maximum take-off weight and their weight when they initially emerge from a manufacturer's assembly line. This, in combination with a generally long and thin profile, in both wings and fuselage, creates a situation where aircraft CG can actually shift aft of the main landing gear at certain times.

This kind of problem is schematically illustrated in FIG. 1, although it should be understood at this point that FIG. 1 discloses a landing gear in accordance with the present invention, and therefore should not be considered as prior art. Directing attention there, shown generally at 1 is an SST type aircraft. Such aircraft has a long CG "box" which is indicated at 2. As the skilled person would know, the CG box is, in actuality, a mathematical envelope that defines the range of possible CG positions between loaded and unloaded conditions. A loaded or nearly loaded CG position is shown at 3, for example, while an unloaded CG position is shown at 4. Arrow 8 indicates the shift.

The main landing gear of large aircraft, including SST's, are generally multi-wheeled or multi-axled, with at least one gear usually being stowed in each wing, as indicated at 5 in FIG. 1. Each gear 5 typically has a main prop 7 that is pivotably connected to a wheel truck, as shown at 9. The number of wheels on any given truck vary from one aircraft model to the next, primarily as a result of differences in model size and weight.

In situations where an aft CG shift occurs, as shown at 4 in FIG. 1, a clockwise turning moment may be created about the wheel truck pivot connection point 9. In certain situations, the magnitude of the turning force may be large enough to actually raise the aircraft nose 10 off the ground. This, in turn, would cause the aircraft tail 11 to collide with the ground in the direction indicated by arrow 12. Such "tip-back" is an undesirable condition as it may result in injury to service personnel standing underneath the tail, or damage the aircraft itself.

Most aircraft can be designed so that the above-described tip-back problem will not occur for any loaded or unloaded weight condition. However, for those aircraft known to have an extremely large CG shift, such as SST's, for example, it has been necessary to develop preventative measures or devices that address possible tip-back situations.

One such device is a tail bumper or hard point that is mounted directly to the under belly of the aircraft tail. This type of device physically absorbs the shock of the tail hitting the ground, thus avoiding structural damage in much the same way as an automobile bumper absorbs the shock of a low speed collision. Another type of preventative device is an independent prop that is placed under the tail. Generally, this is a separate piece of ground service equipment that is not carried by the aircraft. Still another type of preventative device was developed by The Boeing Company for its prototype SST of the mid to late 1960's. There, the landing gear's wheel truck was designed to physically shift aft between flight and ground handling modes, so that it would not be forward of the aircraft CG when on the ground.

All of the above ways for addressing aircraft tip-back have certain short comings. Tail bumpers are not particularly desirable from the standpoint of weight and aerodynamic considerations. Using separate props under the tail as ground service equipment is subject to human error. It creates the possibility that a service person may forget to put the prop in position, resulting in an unplanned tip-back situation, or may forget to remove the prop prior to take-off, resulting in an aborted take-off because of the subsequent inability of the aircraft to rotate its nose upwardly. Lastly, designing landing gear that have trucks with the capability of physically moving, like the Boeing SST of the 1960's, creates increased structural complexity that not only adds weight to the aircraft, but also increases its price from both the manufacturing and maintenance point of view.

The invention disclosed here provides a solution to aircraft tip-back in a manner that avoids the drawbacks of other preventative measures. How the invention accomplishes this will become apparent upon consideration of the following description.

SUMMARY OF THE INVENTION

An aircraft landing gear in accordance with the invention has a wheel truck that carries a plurality of landing gear wheels. At least some of the wheels are in a forward position relative to the length of the truck, while others are in a rearward position. A telescoping main prop member mounts the truck to a landing gear support structure on the aircraft. An upper end of the main prop is pivotably connected to the support structure, while a lower end is pivotably connected to the truck. The lower end connection is generally centered relative to the length of the truck.

The main prop is operable to swing the truck upwardly and downwardly, between a stowed position for aircraft flight and a lowered position for aircraft landings and take-offs. The main prop also has a shock absorber that damps telescopic extension and retraction of its length, retraction generally being caused by force-loading contact of the trucks wheels with the ground as the aircraft descends onto a runway.

In addition to the main prop, the landing gear also has at least one rear telescoping prop member. This latter member has a first, or upper, end pivotably connected adjacent the upper end of the main prop. Its second, or lower, end is pivotably connected to the wheel truck at an aft or rearward position that is offset from the center of the truck. Like the main prop, the rear prop has a shock absorber for damping telescopic extension and retraction of its length in response to the forces acting on it.

The extended-most lengths of both the main and rear props are respectively selected so that the forwardmost or leading wheels of the truck contact the ground first during aircraft landings. The rear prop is releasably lockable, and when the aircraft is on the ground, the rear prop may be locked in a manner so that it will hold a certain fixed length. This prevents pivoting movement of the main prop relative to the truck, and reduces or eliminates the possibility of aircraft tip-back.

Releasable locking of the rear prop is accomplished by a telescopic restraint that, When activated, opposes extension and retraction of the rear prop. This restraint also includes a safety relief mechanism that is operable to automatically deactivate the restraint when a certain force is present on the rear prop.

During normal aircraft operation, the restraint is activated and deactivated by the aircraft crew, or by conventional automatic controls. During a take-off situation, the safety relief mechanism operates to deactivate the restraint just in case it was not deactivated by the crew, or by automatic control, or was otherwise improperly controlled.

Both the restraint and relief mechanisms could be in the form of mechanical pneumatic or hydraulic devices. However, it is presently believed that hydraulic devices are the best choice. In this regard, it is preferred that the rear prop be a conventional hydraulically damped member, having an elongated cylinder, and an elongated rod that is at least partially received in the cylinder. The rod telescopically slides inwardly and outwardly relative to the cylinder as the rear prop respectively retracts and extends.

Inside the cylinder is a hydraulic chamber that is separated or divided by a movable piston into two separate fluid regions. The volume of each fluid region changes correspondingly with changes in the position of the piston. The piston is fixedly connected to the rod, and normally moves or slides within the chamber depending on the direction of force acting on the rear prop member.

In accordance with the invention, each fluid region has at least one port for communicating hydraulic fluid between such region and a fluid reservoir as the piston moves. The telescopic restraint is in the form of a valve that closes off such fluid flow, thus substantially locking the piston in place within the hydraulic chamber. This, in turn, fixes the position of the rod with respect to the cylinder, and fixes the length of the rear prop.

In combination with the above restraint, the safety relief mechanism is preferably a relief valve that is operative to automatically release the hydraulic pressure in at least one of the chamber's fluid regions, in response to a certain threshold force acting on the rear prop. It is necessary that the relief valve be operatively connected to the fluid regions in a manner so as to enable the rear prop to retract.

The invention as summarized above, will become more clearly understood upon consideration of the following description, which is to be read in conjunction with the appended drawings.

BRIEF DESCRIPTION OF THE DRAWINGS

In the drawings, like reference numerals and letters refer to like parts throughout the various views, and wherein:

FIG. 1 is an elevational view of an SST style aircraft having a landing gear in accordance with the invention;

FIG. 2 is an enlarged elevational view of a landing gear in accordance with the invention, and shows the forwardmost wheels of the gear making contact with the ground during an aircraft landing;

FIG. 3 is a view like FIG. 2, but shows the landing gear completely on the ground;

FIG. 4 is a rear view of the landing gear as shown in FIG. 2;

FIG. 5 is a rear view of the landing gear as shown in FIG. 3;

FIG. 6 is a view like FIG. 5, but shows an alternative embodiment of the invention; and FIG. 7 is a schematic view of a telescopic restraint and relief mechanism in accordance with the invention.

BEST MODE FOR CARRYING OUT THE INVENTION

Referring now to FIG. 2, shown at 5 is a landing gear in accordance with a preferred embodiment of the invention. The gear 5 has a main prop 7, and a wheel truck 14. As is best seen in FIGS. 4 and 5, the main prop 7 has an upper end portion 16 that is pivotably connected to a landing gear support structure, or framework 18, in the aircraft 1. More particularly, the upper end portion 16 has a first pivot 20 that is connected to a trunion portion 22 by a pair of spaced arms 24, 26. Trunion portion 22 is pivotably connected directly to framework 18. The main prop 7 also has diverging buttresses 28, 30 that increase the prop's columnar strength for supporting loads.

The prop's lower end 32 is pivotably connected at 9 to wheel truck 14. The wheel truck 14 has a plurality of wheels 34a, 34b, 36a, 36b, 38a, 38b, 40a, 40b (see FIG. 4), mounted to the truck 14 by axles 42, 44, 46, 48 (see FIGS. 2 and 3). The wheel truck 14 shown in FIGS. 2-6 is commonly called a "two by four" truck, because it has eight wheels; two across, and four in a line.

The main prop 7 swings the truck 14 from a stowed position in an aircraft bay 50 to the lowered position shown in FIGS. 2-6. Of course, the landing gear 5 is lowered for aircraft landings, and remains lowered until the aircraft once again takes off. Folding struts 52, 54, 56, 58 lock the gear 5 in the downward position.

The gear 5 further has at least one, and preferably two, rear props 60, 62 (see FIGS. 4 and 5). Each rear prop 60, 62 is pivotably connected at one end to the main prop's upper end portion 16, as shown at 64 in FIGS. 2 and 3. Their lower ends are connected as shown at 66 to an aft or rearward region of wheel truck 14. It is possible that the upper ends of rear props 60, 62 could be pivotably connected to aircraft framework 18. This is not shown in the drawings, however.

In preferred form, the main prop 7 and rear props 60, 62 are telescoping members. That is to say, each retracts and extends depending on the loading placed on wheel truck 14 as the aircraft lands and takes off. Each prop member 7, 60, 62 includes a shock absorber for damping the force of such contact.

By way of example, and referring now to FIGS. 4 and 5, main prop 7 preferably has a piston/cylinder arrangement 66, 68 that is either hydraulically or pneumatically operated. This kind of arrangement is conventional and would be very familiar to a person having knowledge of aircraft landing gears. It should also be mentioned that sometimes prop shock absorbers are mechanical in configuration, and employ coil springs as dampers. This is not shown in the drawings, however, but could be made to work in the main prop 7 of the present invention, if desired.

The rear props 60, 62 are preferably hydraulic in nature. Referring now to FIG. 7, each rear prop 60, 62 has an elongated cylinder portion 70, and an elongated rod portion 72. The rod portion is at least partially received within cylinder portion 70, and moves inwardly and outwardly relative to the cylinder as the prop retracts and extends.

Inside cylinder portion 70 is a hydraulic chamber 74. This chamber is divided or separated into hydraulic fluid regions 76, 78 by a piston 80. The piston 80 is fixedly connected to the end of rod portion 72.

Fluid regions 76, 78 each have ports 82, 84 for communicating hydraulic fluid to and from each region 76, 78 as piston 80 moves one way or another inside chamber 74. These fluid regions 76, 78 are connected to a hydraulic fluid reservoir (not shown) and damp extension and retraction of each rear prop in a known manner.

Referring again to FIG. 2, when the landing gear 5 is lowered during aircraft landing, the main prop 7 and the rear props 60, 62 are extended to their maximum lengths. The extended-most lengths of these members are selected so that the forwardmost wheels 34a, 34b of wheel truck 14 are lower than the rearwardmost wheels 40a, 40b during landing. What this means is that the forwardmost wheels 34a, 34b contact the ground first, and the rearwardmost wheels 40a, 40b contact the ground at a later time. The force of contact is mostly transferred upwardly through main prop 7. The main and rear props 7, 60, 72 retract to the position shown in FIG. 3 when the aircraft 1 is completely on the ground.

In such position, a valve 86 (see FIG. 7) locks rear props 60, 62 into a fixed-length position. In other words, valve 86 closes off the flow to and from fluid regions 76, 78 through ports 82, 84. This effectively prevents piston 80 from moving back and forth inside hydraulic chamber 74. Locking the rear props 60, 62 in this way prevents the wheel truck 14 from pivoting at connection point 9 relative to main prop 7. This further prevents aircraft tip-back as shown at 12 in FIG. 1.

Referring again to FIG. 7, during a take-off situation, valve 86 is opened to deactivate the restraint placed on rear prop 60, 62 so that each rear prop once again behaves normally. In the event the restraint is not removed, an automatic relief valve 88 operates as a safety mechanism and releases the fluid in chamber 76 so that piston 80 can move and permit the rear props 60, 62 to retract. This ensures that the prop will not impede upward lifting of the aircraft nose 10 during a take off situation. Relief valve 88 may be in the form of a conventional, spring-operated valve, or an equivalent device.

FIG. 6 shows an alternative embodiment of the landing gear 5. There, the pair of rear props 60, 62 shown in FIGS. 2-5 are replaced by a single rear prop 90. The upper end portion 16 of the main prop 7 is pivotably connected to support framework 18 by a single pin connection 92. In all other relevant respects, the landing gear 5 shown in FIG. 6 operates in the same manner as the landing gear shown in FIGS. 2-5.

It is to be understood that the preceding description sets forth the best mode for carrying out the invention as it is presently known. It is conceivable that certain changes and improvements will be made to the landing gear 5 without departing from what is considered to be the spirit and scope of the invention. For this reason, the preceding description should not be viewed in a limiting sense. Instead, what is considered to be the invention is defined in the patent claim or claims which follow, the interpretation of which is to be made in accordance with the well-established doctrines of patent claim interpretation.

What is claimed is:

1. A landing gear for an aircraft, comprising:
    a wheel truck having a plurality of wheels, including certain forwardmost wheels and rearwardmost wheels;
    a telescoping main prop member for mounting said wheel truck to a landing gear support structure on said aircraft, said main prop member having an upper end portion pivotably mounted to said support structure, and a lower end portion pivotably mounted to a generally central region of said wheel truck, said main prop member being operable to swing said wheel truck between a certain stowed position during aircraft flight and a lowered position during aircraft landings and take-offs, said main prop member further having a shock absorber that is operable to damp telescopic shortening thereof in response to force-loading contact of said wheel truck with the ground as said aircraft lands; and
    at least one telescoping rear prop member having one end pivotably connected adjacent said upper end portion of said main prop member, and a second end pivotably connected to a rearward region of said wheel truck, said rear prop member having its own shock absorber for damping telescopic shortening thereof in response to said force-loading contact of said wheel truck, and wherein the extended-most lengths of said main and rear prop members are respectively selected so that at least some of said forwardmost wheels contact said ground before said rearwardmost wheels during aircraft landings, and further, the length of said rear prop member being releasably lockable to hold a certain fixed length when said aircraft is on the ground, in a manner so as to prevent pivoting movement of said main prop member relative to said wheel truck.

2. The landing gear of claim 1, wherein said rear prop member further includes a telescopic restraint selectively operable to oppose extension and retraction of said rear prop member after said aircraft has landed; and
    a safety relief mechanism operable to automatically deactivate said telescopic restraint in response to a certain take-off force acting on said rear prop member, in a manner so that said telescopic restraint no longer opposes extension and retraction of said rear prop member.

3. The landing gear of claim 2, wherein said rear prop member further includes an elongated cylinder, and an elongated rod at least partially received in said cylinder, said rod being telescopically slidable inwardly and outwardly relative to said cylinder, said cylinder having a hydraulic chamber that is separated into first and second fluid regions by a movable piston, the volume of said fluid regions being defined by the position of said piston within said hydraulic chamber, said piston being fixedly connected to said rod, and wherein each fluid region in said hydraulic chamber has at least one port for communicating a hydraulic fluid flow to and from said fluid region, and still further,
    said telescopic restraint includes valve means for closing off the fluid flow through said ports.

4. The landing gear of claim 3, wherein said safety relief mechanism further includes a relief valve operative to release the hydraulic pressure in at least one of said fluid regions, in response to said certain take-off force acting on said rear prop member.

5. The landing gear of claim 1, wherein said one end of said rear prop member is pivotably connected to said upper end portion of said main prop member.

6. The landing gear of claim 1, including a pair of spaced apart rear prop members, each one of said pair having a first end pivotably connected adjacent said upper end portion of said main prop member, and a second end pivotably connected to a rearward region of said wheel truck, each one of said pair further having its own shock absorber, for damping telescopic shortening of its length in response to said force-loading contact of said wheel truck.

7. A landing gear for an aircraft, comprising:
a wheel truck having a plurality of wheels;
a main prop member for mounting said wheel truck to a landing gear support structure on said aircraft, said main prop member having an upper end portion pivotably mounted to said support structure, and a lower end portion pivotably mounted to a generally central region of said wheel truck, said main prop member being operable to swing said wheel truck between a certain stowed position during aircraft flight and a lowered position during aircraft landings; and
at least one other prop member having an end pivotably connected adjacent said upper end portion of said main prop member, and a second end pivotably connected to a region of said wheel truck that is offset from said central region, said other prop member normally being telescopically extendable and retractable, and further, said other prop member being releasably lockable to hold a certain fixed length when said aircraft is on the ground, in a manner so as to prevent pivoting movement of said main prop member relative to said wheel truck.

8. The landing gear of claim 7, wherein said at least one other prop member further includes a telescopic restraint selectively operable to oppose extension and retraction of said at least one other prop member after said aircraft has landed; and
a safety relief mechanism operable to automatically deactivate said telescopic restraint in response to a certain take-off force acting on said at least one other prop member, in a manner so that said telescopic restraint no longer opposes extension and retraction of said at least one other prop member.

9. The landing gear of claim 8, wherein said at least one other prop member is positioned rearwardly of said main prop member, and wherein said second end of said at least one other prop member is pivotably connected to a rearward region of said wheel truck.

10. The landing gear of claim 9, wherein said at least one other prop member further includes an elongated cylinder, and an elongated rod that is at least partially received in said cylinder, said rod being telescopically slidable inwardly and outwardly relative to said cylinder, said cylinder having a hydraulic chamber that is separated into first and second fluid regions by a movable piston, the volume of said fluid regions being defined by the position of said piston within said hydraulic chamber, said piston being fixedly connected to said rod, and wherein each fluid region has at least one port for communicating hydraulic fluid to and from said fluid region, and wherein
said telescopic restraint includes valve means for closing off the fluid flow through said ports.

11. The landing gear of claim 10, wherein said safety relief mechanism further includes a relief valve operative to relieve the hydraulic pressure in at least one of said fluid regions, in response to said certain take-off force acting on said other prop member.

* * * * *